Dec. 2, 1947.   H. H. SCHNEIDER   2,431,773
DEICING AND HEATING DEVICE FOR MOTOR VEHICLES
Filed Dec. 30, 1943
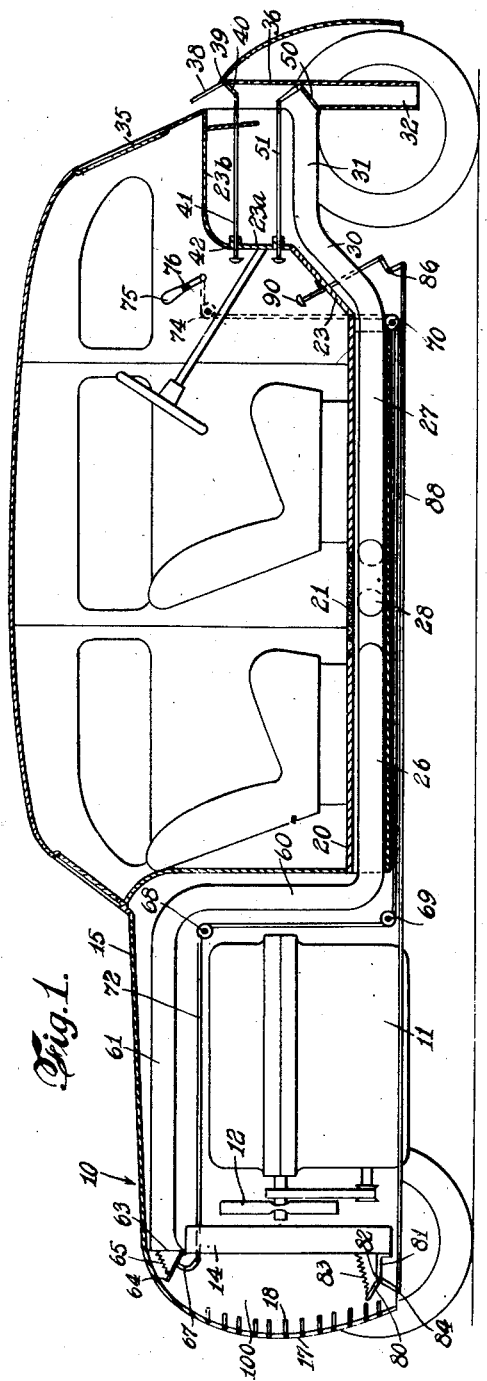
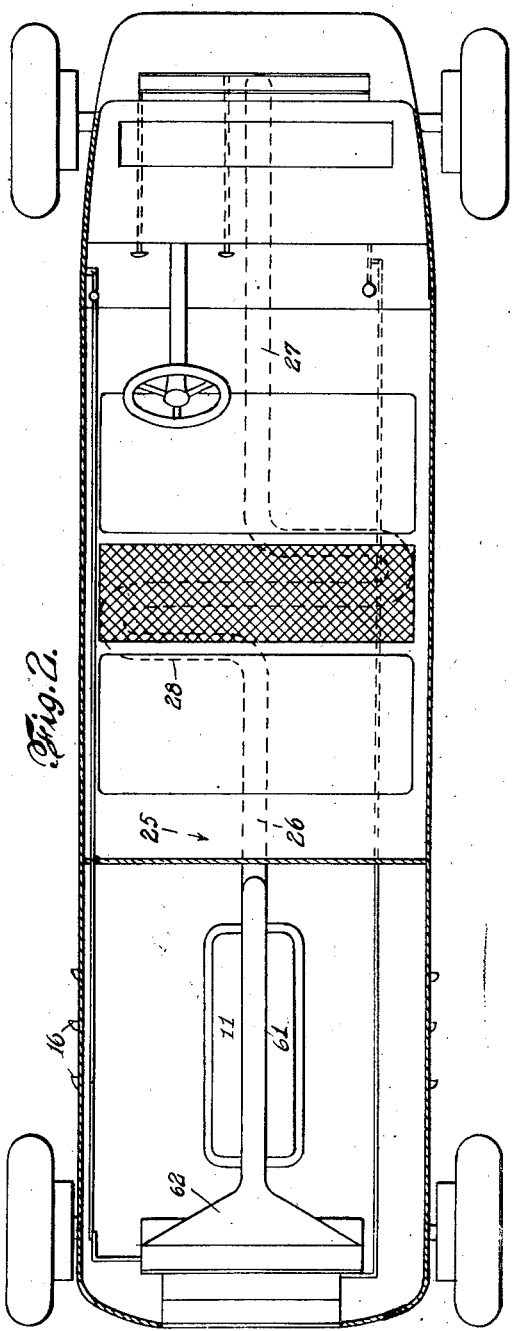
INVENTOR.
HARRY H. SCHNEIDER
BY
Carl Miller
ATTORNEY.

Patented Dec. 2, 1947

2,431,773

UNITED STATES PATENT OFFICE 2,431,773

DEICING AND HEATING DEVICE FOR MOTOR VEHICLES

Harry H. Schneider, Bronx, N. Y.

Application December 30, 1943, Serial No. 516,293

11 Claims. (Cl. 237—12.3)

1

This invention relates to de-icing and heating device for motor vehicles.

An object of this invention is to provide in a motor vehicle such as an automobile, means to use the heat developed by the motor of the engine for heating the interior of the vehicle and also for de-icing the front windshield.

A further object of this invention is to provide in a device of the character described, means to render the heating equipment inoperative during the summer and for easily putting it into operation for winter.

Yet a further object of this invention is to provide control means for the heating device adapted to be actuated by the operator of the automobile.

Yet a further object of this invention is to provide in a motor car, highly improved heating means of the character described, which shall be relatively inexpensive to install in the vehicle and which shall be easy to manipulate and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a vertical, cross-sectional view through a vehicle provided with heating apparatus embodying the invention; and Fig. 2 is a longitudinal sectional view taken on a horizontal line.

Referring now in detail to the drawing, 10 designates a motor vehicle provided with heating apparatus embodying the invention. For the purpose of illustration the vehicle 10 is shown in the form of an automobile provided with an engine 11 at the rear. The engine is provided with a usual fan 12 and in the rear of the engine and adjacent the fan is the radiator 14. Over the engine is a hood 15 provided with side louvers 16. At the front of the hood is a grill 17 comprising a plurality of parallel hinged shutters 18 which may be swung shut in any suitable manner to close up the hood during the winter.

The automobile is further provided with a floor 20 provided with a screen or grill 21 preferably between the front and rear seats. At the front of the automobile is a foot board 23. Below the floor 20 is a pipe 25 having longitudinal portions

2

26 and 27 interconnected by an S-shaped transverse portion 28 located beneath the screen or grill 21. Pipe portion 27 extends beneath the foot board 23 as at 30 and then forwardly as at 31. Extending from the forward portion 31 is a downwardly extending pipe 32 open at its lower end and communicating with the exterior of the car. Extending from the exterior 23 is an upwardly extending wall 23a disposed in front of the operator and constituting the dash board of the vehicle. Extending forwardly from the dash board 23a is a portion 23b extending to a point below the windshield 35. Extending upwardly from pipe 32 is a pipe 36 communicating also with pipe 31.

Pipe 36 extends to a point just below and in front of the front windshield 35. The upper end of pipe 36 may be closed by a valve or shutter 38 hinged to the upper end of said pipe as at 39. Fixed to the shutter 38 is an arm 40 and pivoted to said arm is a horizontal rod 41 passing through an opening 42 in the dash board and provided with a button at its front end. The operator may push or pull the rod to either open or close the shutter 38.

As will appear hereinafter heated air is passed through the pipe 25 and when the shutter 38 is open the heated air can pass upwardly to de-ice the windshield 35. Another shutter or valve 50 is located between pipe 32 and pipes 31 and 36. This valve or shutter 50 is under the control of a push rod 51 extending through an opening in the dash board and likewise adapted to be actuated by the operator.

Thus if it is not desired to de-ice the windshield valve 38 may be closed and valve 50 opened to permit the heated air to escape to the atmosphere.

Extending from pipe portion 26 is a pipe portion 60 extending upwardly in front of the engine. Extending from pipe portion 60 is a horizontal pipe portion 61 disposed beneath the hood 15 and above the engine. At the rear end of pipe portion 61 is a funnel 62 open at its rear end as at 63. The shutter or valve 64 hinged to the lower edge of the funnel is adapted to close the funnel. A coil spring 65 connected to the valve normally urges it into closed position.

Means is provided for the operator to open the valve 64. To this end there is fixed to said valve an arm 67. Within the car at the front of the engine are upper and lower pulleys 68 and 69. Below the floor 20 and in front of the operator's seat is another pulley 70. Connected to arm 67 is a cord or cable 72 passing over pulley 68 beneath pulley 69 and beneath pulley 70 and upwardly through an opening in the floor of the vehicle.

At the side of the automobile and in front of the driver's seat is a pulley 74. The cable passes over the pulley and is attached to a lever 75. Lever 75 may be hinged as at 76.

It will now be understood that a pull on the lever will pull the cable to open the valve 64.

Any suitable means may be provided to lock the lever in valve opening position. When valve 64 is opened air sucked into the hood through the louvers 16 will be heated by the engine and blown through the radiator into the vehicle. In the summer the valve 64 may be closed.

It will be noted that heated air passing into pipe 25 will heat the interior of the car as air heated by pipe portion 28 may pass upwardly through the floor grill 21. The heated air will also de-ice the front windshield as explained hereinabove.

The passage between the lower end of the radiator and the grill 17 may be closed by a valve 80 hinged to a bracket 81 at the lower end of the radiator as at 82. The valve is normally urged to opened position by a coil spring 83 connecting said valve with the radiator.

Means is provided to enable the operator to close valve 80. To this end there is fixed to valve 80 an arm 84. Hinged to the underside of the car in any suitable manner is a bell crank 86. Interconnecting one arm of the bell crank with arm 84 is a connecting rod or link 88. The bell crank 86 may be rotated by a foot pedal 90 at the floor board. Upon depressing the foot pedal the rod 88 is pulled forwardly to shut valve 80. When valve 80 is shut and the shutter 18 is also closed a chamber 100 is formed between the radiator and the grill 17 for the accumulation of heated air passing into the funnel 62. The motor fan 12 obviously acts as a blower for the heating system.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a vehicle having an engine at the rear and a radiator in back of the engine and a grill in back of the radiator and a hood covering the engine, and said vehicle being provided with a floor formed with a screen and with a windshield at the front of the vehicle, a pipe extending from above the radiator to beneath the floor and to a point beneath and in front of the windshield, said pipe being adapted to carry air heated by the engine to heat the interior of the vehicle through said screen, and to bring heated air to the windshield for de-icing the same.

2. In a vehicle having an engine at the rear and a radiator in back of the engine and a grill in back of the radiator and a hood covering the engine, and said vehicle being provided with a floor formed with a screen and with a windshield at the front of the vehicle, a pipe extending from above the radiator to beneath the floor and to a point beneath and in front of the windshield, said pipe being adapted to carry air heated by the engine to heat the interior of the vehicle through said screen, and to bring heated air to the windshield for de-icing the same, a valve, and valve means to close the pipe at the windshield, and means to close said valve under the control of the operator.

3. In a vehicle having an engine at the rear and a radiator in back of the engine and a grill in back of the radiator and a hood covering the engine, and said vehicle being provided with a floor formed with a screen and with a windshield at the front of the vehicle, a pipe extending from above the radiator to beneath the floor and to a point beneath and in front of the windshield, said pipe being adapted to carry air heated by the engine to heat the interior of the vehicle through said screen, and to bring heated air to the windshield for de-icing the same, a valve, and valve means to close the pipe at the windshield, means to close said valve under the control of the operator, a valve at the rear end of the pipe, and means for the operator to close said last-mentioned valve.

4. In a vehicle having an engine at the rear and a radiator in back of the engine and a grill in back of the radiator and a hood covering the engine, and said vehicle being provided with a floor formed with a screen and with a windshield at the front of the vehicle, a pipe extending from above the radiator to beneath the floor and to a point beneath and in front of the windshield, said pipe being adapted to carry air heated by the engine to heat the interior of the vehicle through said screen, and to bring heated air to the windshield for de-icing the same, a valve, and valve means to close the pipe at the windshield, means to close said valve under the control of the operator, a valve at the rear end of the pipe, means for the operator to close said last-mentioned valve, a valve between the lower end of the radiator and the grill at the rear of the vehicle, and means under the control of the operator for closing said last-mentioned valve.

5. In a vehicle having a bottom floor and an engine at the rear, and provided with a wall between the engine and the interior of the vehicle, the floor of the vehicle being provided with a screen, said vehicle having a windshield at its front end, a pipe extending above the engine and open at the rear end thereof, said pipe passing between said engine and said wall and below the floor of the vehicle and to a point below the windshield, said pipe having a branch extending to the atmosphere, a valve to close the pipe at the point where it leads to the windshield, and a second valve to close said branch.

6. In a vehicle having a bottom floor and an engine at the rear, and provided with a wall between the engine and the interior of the vehicle, the floor of the vehicle being provided with a screen, said vehicle having a windshield at its front end, a pipe extending above the engine and open at the rear end thereof, said pipe passing between said engine and said wall and below the floor of the vehicle and to a point below the windshield, said pipe having a branch extending to the atmosphere, a valve to close the pipe at the point where it leads to the windshield, a second valve to close said branch, and means under the control the operator to operate said valves selectively.

7. In a vehicle having a bottom floor and an engine at the rear, and provided with a wall between the engine and the interior of the vehicle, the floor of the vehicle being provided with a screen, said vehicle having a windshield at its front end, a pipe extending above the engine and open at the rear end thereof, said pipe passing between said engine and said wall and below the floor of the vehicle and to a point below the windshield, said pipe having a branch extending to the atmosphere, a valve to close the pipe at the point where it leads to the windshield, a second valve to close said branch, means under the control of the operator to operate said valves selectively, the rear open end of the pipe being provided with a valve, and means under the control of the operator to open said last valve.

8. In a vehicle having a bottom floor and an engine at the rear, and provided with a wall between the engine and the interior of the vehicle, the floor of the vehicle being provided with a screen, said vehicle having a windshield at its front end, a pipe extending above the engine and open at the rear end thereof, said pipe passing between said engine and said wall and below the floor of the vehicle and to a point below the windshield, said pipe having a branch extending to the atmosphere, a valve to close the pipe at the point where it leads to the windshield, a second valve to close said branch, means under the control of the operator to operate said valves selectively, the rear open end of the pipe being provided with a valve, means under the control of the operator to open said last valve, said vehicle being provided with a hood for said engine, said hood having a grill at its rear end and shutters to close said grill, said vehicle being provided with a radiator in back of the engine, a fan on said engine to blow air heated by the engine past the radiator, said heated air being adapted to enter said pipe, a chamber being formed between the radiator and the shutter, and means under the control of the operator to close the lower end of said chamber.

9. The combination with a road vehicle having an engine and a radiator for cooling the same and a fan for forcing air through the radiator, of a grill arranged outwardly of the radiator and constructed to exclude fresh air from entering the radiator, the radiator and the grill being spaced apart, a conduit having an intake located above the radiator and arranged to receive heated air from the space between the grill and the radiator, said conduit extending forwardly of the engine and radiator and being provided with means for heating the interior of the vehicle, the forward end of the conduit being disposed forwardly of the windshield of the vehicle and arranged to discharge heated air against the forward face of the windshield for the purpose of preventing the accumulation of frost thereon, a valve for preventing the flow of heated air into said intake, a flexible control operating from the forward end of the vehicle for operating the valve, and means for preventing the flow of heated air to the windshield.

10. The combination with a road vehicle having an engine located in the rear thereof and provided with a windshield in the forward end thereof, said vehicle also having a radiator located in the rear of the engine and a fan driven by the engine for forcing air through the radiator, a grill located outwardly of the radiator and adapted to be closed, a conduit having an intake located above the engine and the radiator and extending forwardly to discharge heated air against the forward face of the wnidshield, said conduit being depressed between its intake and its forward end and extending under the passenger compartment of the vehicle to transmit heat thereto, a valve for closing the intake of the conduit, a flexible cord for operating the valve from the forward end of the vehicle, a valve for controlling the admission of air to the space between the radiator and grill, and a valve for controlling the discharge of air from the conduit to the forward face of the windshield.

11. In combination, an automobile having a windshield at its forward end and an engine at its rearward end, a radiator for cooling the engine located rearwardly of the latter, a movable shutter located rearwardly of the radiator, a fan operated by the engine located rearwardly thereof and forwardly of the radiator, an air conduit longitudinally disposed upon the automobile with the rear end thereof located over the radiator for receiving heated air rising from the latter, said conduit extending forwardly past the passenger compartments of said automobile and having the forward end thereof terminating forwardly of the windshield, a movable shutter for said forward end of the conduit, a depending air conduit having the lower end normally open and the upper end connected to a forward portion of the first mentioned air conduit within the forward end thereof, a shutter for opening and closing the rear end of said first mentioned air conduit, and means for operating the shutters from the forward end of the automobile to open or close said shutters at will.

HARRY H. SCHNEIDER.

REFERENCES CITED

The following references are of record in the file of this patent:

UNITED STATES PATENTS

| Number | Name | Date |
|---|---|---|
| 2,240,062 | Welch | Apr. 29, 1941 |
| 1,986,405 | Mears | Jan. 1, 1935 |
| 2,151,865 | Nallinger | Mar. 28, 1939 |
| 1,177,022 | Crist | Mar. 28, 1916 |
| 2,302,416 | Brooks | Nov. 17, 1942 |
| 1,331,384 | Sainsbury | Feb. 17, 1920 |
| 1,943,108 | Colby | Jan. 9, 1934 |
| 2,333,818 | Raney | Nov. 9, 1943 |
| 1,762,466 | Bovey | June 10, 1930 |